(12) United States Patent
Hirata et al.

(10) Patent No.: US 11,122,460 B2
(45) Date of Patent: Sep. 14, 2021

(54) POLICY CONTROL SYSTEM, PCRF ENTITY, POLICY CONTROL METHOD, AND NON-TRANSITORY COMPUTER READABLE MEDIUM

(71) Applicant: NEC CORPORATION, Tokyo (JP)

(72) Inventors: Kyoji Hirata, Tokyo (JP); Toru Yamada, Tokyo (JP); Masahiro Serizawa, Tokyo (JP); Akira Kamei, Tokyo (JP); Yumiko Okuyama, Tokyo (JP); Masashi Shimoma, Tokyo (JP); Satoshi Hasegawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 406 days.

(21) Appl. No.: 16/083,719

(22) PCT Filed: Nov. 28, 2016

(86) PCT No.: PCT/JP2016/004981
§ 371 (c)(1),
(2) Date: Sep. 10, 2018

(87) PCT Pub. No.: WO2017/154057
PCT Pub. Date: Sep. 14, 2017

(65) Prior Publication Data
US 2020/0305021 A1 Sep. 24, 2020

(30) Foreign Application Priority Data
Mar. 11, 2016 (JP) .............................. JP2016-047982

(51) Int. Cl.
*H04W 28/02* (2009.01)
*H04W 8/18* (2009.01)
*H04W 24/10* (2009.01)

(52) U.S. Cl.
CPC ....... *H04W 28/0289* (2013.01); *H04W 8/186* (2013.01); *H04W 24/10* (2013.01); *H04W 28/0231* (2013.01)

(58) Field of Classification Search
CPC combination set(s) only.
See application file for complete search history.

(56) References Cited

U.S. PATENT DOCUMENTS

| | | | |
|---|---|---|---|
| 8,249,551 B2 * | 8/2012 | Jones | ...... H04L 63/20 455/406 |
| 8,429,268 B2 * | 4/2013 | Riley | ...... H04L 63/10 709/224 |

(Continued)

FOREIGN PATENT DOCUMENTS

JP 2014-140231 A 7/2014

OTHER PUBLICATIONS

3GPP TR 23.769 V13.0.0, "3rd Generation Partnership Project; Technical Specification Group Services and System Aspects; Group based Enhancements, (Release 13)", Jun. 2015, pp. 1-38.

(Continued)

*Primary Examiner* — Anh Vu H Ly
(74) *Attorney, Agent, or Firm* — Sughrue Mion, PLLC

(57) ABSTRACT

An object is to provide a policy control system that can easily change a policy. A policy control system according to the present invention includes a PCRF entity (10) including a policy control unit (11) for determining a policy to be applied to a group including a plurality of wireless terminals according to environmental information changed at a specified timing and a PCEF entity (20) including a policy control execution unit (21) for applying the policy determined by the policy control unit (11) to communication related to the plurality of wireless terminals included in the group.

9 Claims, 9 Drawing Sheets

| GROUP NAME | TIME OF DAY | CONGESTION STATE | UL APN AMBR | DL APN AMBR |
|---|---|---|---|---|
| Group A | AM9:00-PM9:00 | A1 | U1 | D1 |
| | | A2 | U2 | D2 |
| | PM9:00-AM9:00 | A1 | U3 | D3 |
| | | A2 | U4 | D4 |
| Group B | ALL DAY | A1 | U1 | D2 |
| | | A2 | U4 | D4 |
| Group C | ALL DAY | ANY TIME | U5 | D5 |

(56) References Cited

U.S. PATENT DOCUMENTS

| | | | | |
|---|---|---|---|---|
| 8,615,237 | B2* | 12/2013 | Baniel | H04L 67/28 |
| | | | | 455/435.2 |
| 8,681,622 | B2* | 3/2014 | Chatterjee | H04L 47/12 |
| | | | | 370/232 |
| 9,055,411 | B2* | 6/2015 | Liang | H04W 4/08 |
| 9,178,822 | B2* | 11/2015 | Norp | H04L 47/12 |

OTHER PUBLICATIONS

3GPP TS 23.203 V13.6.0, "3rd Generation Partnership Project; Technical Specification Group Services and System Aspects; Policy and charging control architecture (Release 13)", Dec. 2015, pp. 1-242.

International Search Report of PCT/JP2016/004981 dated Dec. 20, 2016 [PCT/ISA/210].

* cited by examiner

| GROUP NAME | TIME OF DAY | CONGESTION STATE | UL APN AMBR | DL APN AMBR |
|---|---|---|---|---|
| Group A | AM9:00-PM9:00 | A1 | U1 | D1 |
| | AM9:00-PM9:00 | A2 | U2 | D2 |
| | PM9:00-AM9:00 | A1 | U3 | D3 |
| | PM9:00-AM9:00 | A2 | U4 | D4 |
| Group B | ALL DAY | A1 | U1 | D2 |
| | ALL DAY | A2 | U4 | D4 |
| Group C | ALL DAY | ANY TIME | U5 | D5 |

Fig. 4

POLICY CONTROL SYSTEM, PCRF ENTITY, POLICY CONTROL METHOD, AND NON-TRANSITORY COMPUTER READABLE MEDIUM

CROSS REFERENCE TO RELATED APPLICATIONS

This application is a National Stage of International Application No. PCT/JP2016/004981, filed Nov. 28, 2016, claiming priority based on Japanese Patent Application No. 2016-047982, filed Mar. 11, 2016, the entire contents of which are hereby incorporated by reference.

TECHNICAL FIELD

The present invention relates to a policy control system, a PCRF entity, a policy control method, and a program. In particular, the present invention relates to a policy control system, a PCRF entity, a policy control method, and a program for determining a policy to be applied to a group including a plurality of wireless terminals.

BACKGROUND ART

In recent years, studies have been conducted to provide services using MTC (Machine Type Communication) devices that autonomously execute communication without involving a user's operation. The studied services are, for example, to install temperature measurement devices as MTC devices in respective places, collect information measured by temperature measurement devices to provide temperatures at the respective places. Many MTC devices are often used when services using the MTC device are provided.

Further, a mobile network accommodating the MTC devices defines a policy for controlling communication related to the MTC device. Examples of the policy include AMBR (Aggregate Maximum Bit Rate) that is a regulation related to a communication speed or a transmission capacity of the MTC device. An enormous number of the MTC devices are accommodated in the mobile network. Thus, it is assumed that a processing load on the mobile network increases when control for setting the policy is executed for each MTC device.

In order to solve this problem, Non Patent Literature 1 describes an introduction of the concept of an MTC group including a plurality of MTC devices to execute control for setting the policy on the MTC group. Specifically, the mobile network uniquely assigns a DL/UL APN AMBR (Downlink/Uplink Access Point Name AMBR) as the policy to each MTC group. In other words, the mobile network statically assigns the policy to each MTC group. The plurality of MTC devices belonging to the MTC group execute communication according to the policy set in the MTC group.

CITATION LIST

Non Patent Literature

Non Patent Literature 1: 3GPP TR 23.769 V13.0.0 (2015-06)

SUMMARY OF INVENTION

Technical Problem

However, when the policy control described in Non Patent Literature 1 is used, there is a problem that once the policy is assigned to the MTC group, it requires a network administrator or the like to perform a setting operation in order to change the policy. That is, the problem is that the policy assigned to the MTC group cannot be easily changed. For example, in order to change the policy assigned to the MTC group according to a demand such as increasing the DL/UL APN AMBR in specific time of day and changing the DL/UL APN AMBR based on traffic variation etc., there is a problem that a workload of the network administrator or the like becomes enormous, thereby increasing the possibility of causing a setting error and the like.

An object of the present invention is to provide a policy control system, a PCRF entity, a policy control method, and a program that can easily change policies.

Solution to Problem

A first example aspect of the present invention is a policy control system including: a policy control unit configured to determine a policy to be applied to a group including a plurality of wireless terminals according to environmental information changed at a specified timing; and a policy control execution unit configured to apply the policy determined by the policy control unit to communication related to the plurality of wireless terminals included in the group.

A second example aspect of the present invention is a PCRF entity including a policy control unit configured to determine a policy to be applied to a group including a plurality of wireless terminals according to environmental information changed at a specified timing and transmit information about the determined policy to a PCEF entity that applies the policy to communication related to the plurality of wireless terminals included in the group.

A third example aspect of the present invention is a policy control method including: determining a policy to be applied to a group including a plurality of wireless terminals according to environmental information changed at a specified timing; and transmitting information about the determined policy to a PCEF entity that applies the policy to communication related to the plurality of wireless terminals included in the group.

A fourth example aspect of the present invention is a program that causes a computer to execute: determine a policy to be applied to a group including a plurality of wireless terminals according to environmental information changed at a specified timing; and transmit information about the determined policy to a PCEF entity that applies the policy to communication related to the plurality of wireless terminals included in the group.

Advantageous Effects of Invention

The present invention can provide a policy control system, a PCRF entity, a policy control method, and a program that can easily change policies.

BRIEF DESCRIPTION OF DRAWINGS

FIG. 4 is a diagram showing information managed in a policy database according to the second embodiment;

DESCRIPTION OF EMBODIMENTS

First Embodiment

Figure 1:
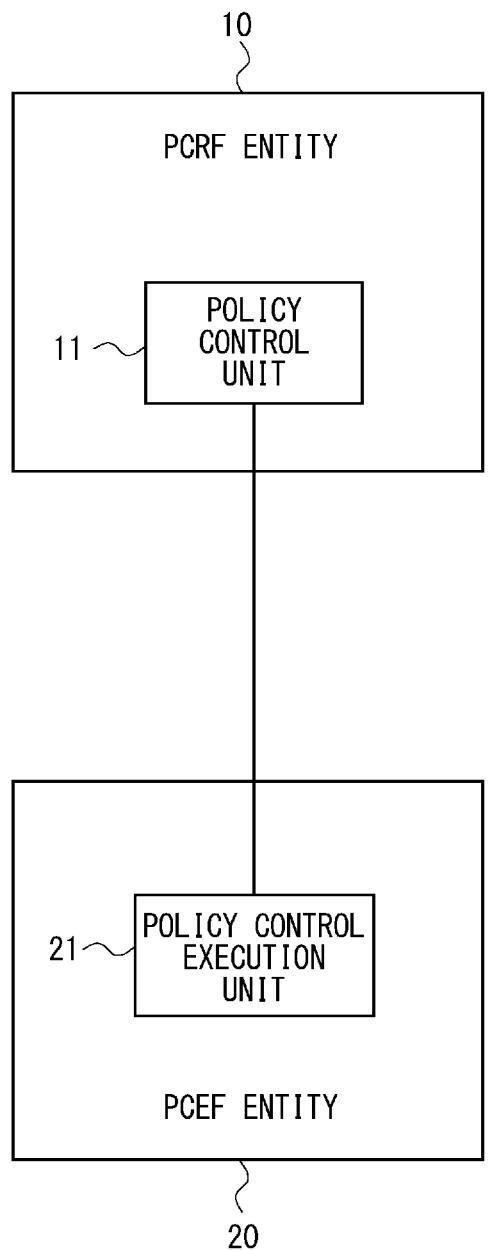
FIG. 1 is a configuration diagram of a policy control system according to a first embodiment.

Hereinafter, embodiments of the present invention will be described with reference to the drawings. A configuration example of a policy control system according to a first embodiment of the present invention will be described with reference to FIG. 1. A policy control system of FIG. 1 includes a Policy Control and Charging Rules Function (PCRF) entity 10 and a Policy and Charging Enforcement Function (PCEF) entity 20.

The PCRF is a logical node defined by 3rd Generation Partnership Project (3GPP) for managing policies, charging rules, etc. The PCRF entity 10 is a physical device or apparatus including a function executed by the PCRF, which is the logical node.

3GPP defines that the PCEF is a logical node that executes policies and charging rules managed by the PCRF. The PCEF entity 20 is a physical device or apparatus including the function executed by the PCEF, which is the logical node. The PCRF entity 10 and the PCEF entity 20 may be computer apparatuses that operate when a processor executes a program stored in a memory.

Next, a configuration example of the PCRF entity 10 will be described. The PCRF entity 10 includes a policy control unit 11. The components constituting the PCRF entity 10 may be software or modules, processing of which is executed by a processor executing a program stored in a memory. Alternatively, the components constituting the PCRF entity 10 may be hardware such as circuits or chips.

The policy control unit 11 determines the policy to be applied to a group including a plurality of wireless terminals according to environmental information changed at a specified timing. Specifically, the policy control unit 11 changes the policy to be applied to the group each time the environmental information is changed. Alternatively, the policy control unit 11 determines whether to change the policy to be applied to the group each time the environmental information is changed. The environmental information may be, for example, time, a temperature, illuminance, an operating status of the wireless terminal belonging to the group, a traffic status of the network, or a combination thereof. The time may be, for example, information indicating daytime or nighttime. The traffic status of the network includes, for example, at least one of a traffic status in a Radio Area Network (RAN) and a traffic status in a mobile core network. The radio area network may be, for example, an area between the wireless terminals and the base station. According to the 3GPP, the mobile core network is a network composed of, for example, an MME (Mobility Management Entity), an SGW (Serving Gateway), and a PGW (Packet Data Network Gateway), which are defined as node devices transmitting U-Plane data or C-Plane data.

The policy control unit 11 may collect, for example, the environmental information from an external apparatus different from the PCRF entity 10. The policy control unit 11 may receive the environmental information transmitted at the timing when the external apparatus detects a change in the environmental information. Alternatively, the policy control unit 11 may periodically collect the environmental information from the external apparatus.

A wireless terminal belongs to one or more groups. For example, a plurality of wireless terminals detecting the same environmental information may belong to a specific group, or wireless terminals used to provide the same service may belong to a specific group.

As the policy, for example, a DL/UL APN AMBR (Downlink/Uplink Access Point Name AMBR) may be used. The DL APN AMBR is a bit rate applied to data transmitted from the mobile core network to the plurality of wireless terminals belonging to the specific group. The APN is, for example, information for identifying a service to be provided. The UL APN AMBR is a bit rate applied to data transmitted from the plurality of wireless terminals belonging to the specific group to the mobile core network. In other words, the DL/UL APN AMBR is an upper limit value of the bit rate applied to data transmission related to a specific APN.

The plurality of wireless terminals execute communication in accordance with the policy applied to the group to which they belong.

Next, a configuration example of the PCEF entity 20 will be described. The PCEF entity 20 includes a policy control execution unit 21. The components constituting the PCEF entity 20 may be software or modules, processing of which is executed by a processor executing a program stored in a memory. Alternatively, the components constituting the PCEF entity 20 may be hardware such as circuits or chips.

The policy control execution unit 21 applies the policy determined by the policy control unit 11 to the communication related to the plurality of wireless terminals included in the group. The communication related to the plurality of wireless terminals is, for example, uplink or downlink communication. Applying the policy may be, for example, to control the uplink or downlink communication so that it does not exceed the DL/UL APN AMBR. Specifically, applying the policy may be, for example, to delete transmitted data exceeding the DL/UL APN AMBR in the uplink or downlink communication. Alternatively, applying the policy may be to stop the use of a specific APN or application.

As described above, a congestion control system of FIG. 1 enables the PCRF entity 10 to change the policy applied to the group every time the environmental information is changed. Thus, it is possible to apply a dynamically changing policy to the plurality of wireless terminals belonging to the group. As a result, the policy is autonomously changed according to the change in the environmental information, thereby greatly reducing the workload involved in changing the policy. In the description for the configuration of the congestion control system of FIG. 1, the PCRF entity 10 includes the policy control unit 11. However, an apparatus including the policy control unit 11 is not limited to the PCRF entity 10. Likewise, in the description for the congestion control system of FIG. 1, the PCEF entity 20 includes the policy control execution unit 21. However, an apparatus including the policy control execution unit 21 is not limited to the PCEF entity 20.

Moreover, it is possible to perform fine-tuned policy control such as changing the policy applied to the group according to time of day. Further, the importance may be determined for each group. The policy may be determined in such a way that high quality communication can be provided to a group with a high importance.

In addition, when the policy cannot be easily changed, it has been necessary to excessively reduce the bandwidth for the group with low importance at all times in order to set aside the bandwidth for the group with high importance. On the other hand, the congestion control system of FIG. 1 enables the policy to be easily changed. Thus, for example, it is possible to perform control such as reducing the bandwidth for the group with low importance only when the network is congested.

Second Embodiment

Figure 2:
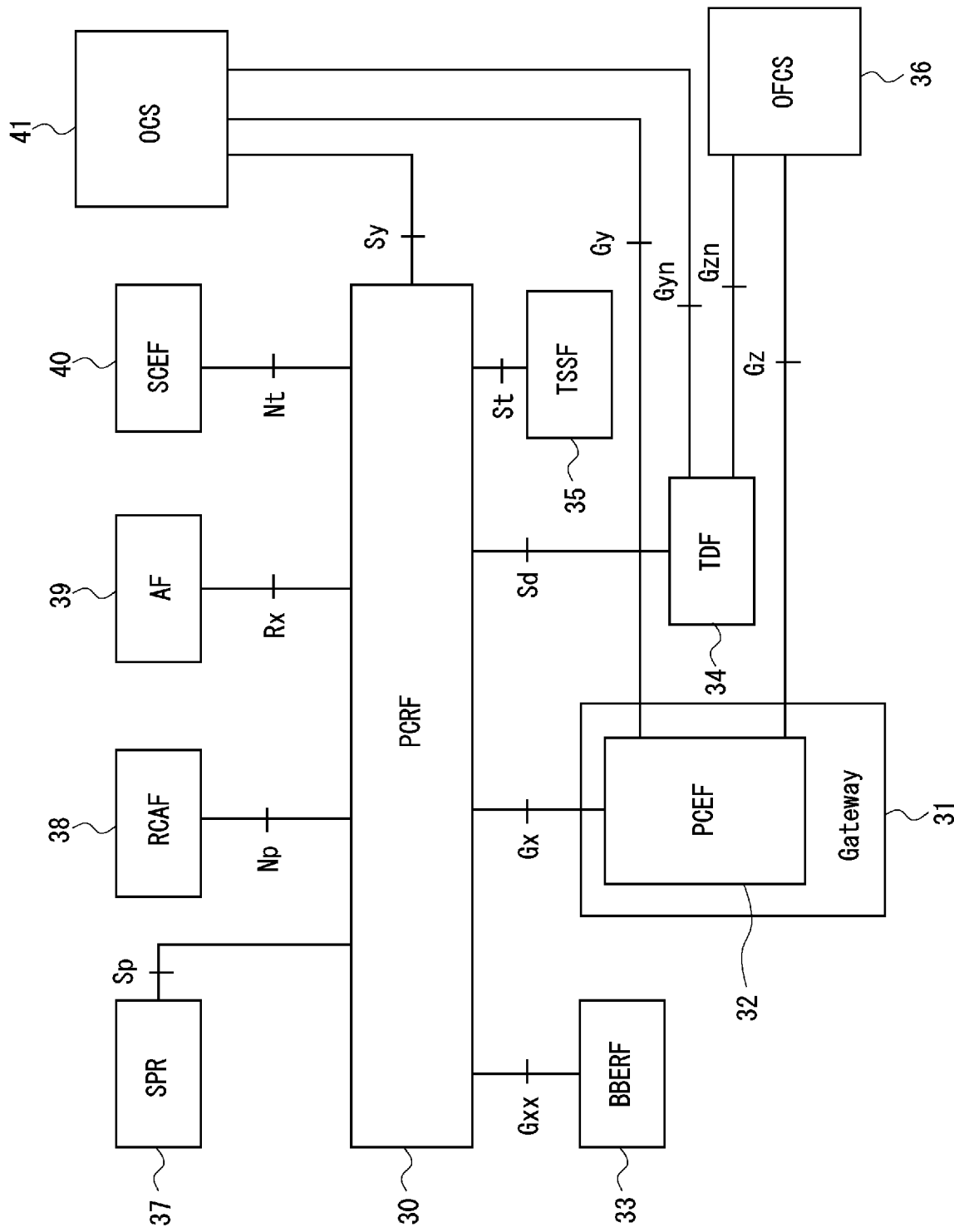
FIG. 2 is a configuration diagram of a policy control system according to a second embodiment.

Next, a configuration example of a congestion control system according to a second embodiment of the present invention will be described with reference to FIG. 2. The congestion control system of FIG. 2 refers to 3GPP TS23.203 V13.6.0 (2015-12). The congestion control system of FIG. 2 includes a PCRF entity 30 (hereinafter referred to as a PCRF 30), a Gateway 31, a Bearer Binding and Event Reporting Function (BBERF) entity 33 (hereinafter referred to as a BBERF 33), a TDF (Traffic Detection Function) entity 34 (hereinafter referred to as a TDF 34), a Traffic Steering Support Function (TSSF) entity 35 (hereinafter referred to as a TSSF 35), an OFCS (Offline Charging System) 36, an SPR (Subscription Profile Repository) 37, an RCAF (RAN Congestion Awareness Function) entity 38 (hereinafter referred to as RCAF 38), an AF (Application Function) entity 39 (hereinafter referred to as an AF 39), a Service Capability Exposure Function (SCEF) entity 40 (hereinafter referred to as an SCEF 40), and an OCS (Online Charging System) 41.

The Gateway 31 includes a PCEF 32, which is a logical node. The Gateway 31 is a physical gateway apparatus including a function executed by the PCEF 32, which is the logical node. The Gateway 31 corresponds to the PCEF entity 20 in FIG. 1. In other words, the Gateway 31 includes the policy control execution unit 21 in FIG. 1. The Gateway 31 may be a PGW used as an apparatus for relaying U-Plane data between an external network and UE (User Equipment). The UE is used as a generic term for a wireless terminal in 3GPP.

An interface defined by 3GPP is set between the respective apparatuses. An Sp interface is set between the PCRF 30 and the SPR 37. An Np interface is set between the PCRF 30 and the RCAF 38. An Rx interface is set between the PCRF 30 and the AF 39. An Nt interface is set between the PCRF 30 and the SCEF 40. An Sy interface is set between the PCRF 30 and the OCS 41. A Gxx interface is set between the PCRF 30 and the BBERF 33. A Gx interface is set between the PCRF 30 and the PCEF 32. An Sd interface is set between the PCRF 30 and the TDF 34. An St interface is set between PCRF 30 and the TSSF 35. A Gy interface is set between the PCEF 32 and the OCS 41. A Gz interface is set between the PCEF 32 and the OFCS 36. A Gyn interface is set between the TDF 34 and the OCS 41. A Gzn interface is set between the TDF 34 and the OFCS 36.

The PCRF 30 and the Gateway 31 are similar to the PCRF entity 10 and the PCEF entity 20 in FIG. 1, respectively, thus detailed descriptions thereof is omitted.

The SPR 37 is a node device that manages subscriber information about the UE. The subscriber information may be referred to as service contract information. The SPR 37 also manages the group to which the UE belongs as the subscriber information about the UE.

The RCAF 38 monitors a congestion status of the RAN. The congestion status may be referred to as a traffic status or a congestion state. The congestion status of the RAN may be indicated using, for example, a throughput of data transmitted via the RAN, and the number of UEs connected to the base station via the RAN. For example, when the throughput in the RAN exceeds a predetermined throughput, or when the number of UEs connected to the base station via the RAN exceeds a predetermined number, the RCAF 38 may determine that the RAN is congested.

The TDF 34 monitors the congestion status in the mobile core network. The congestion status of the mobile core network may be indicated using, for example, a throughput of data transmitted via the mobile core network, and the number of UEs registered in the mobile core network. For example, when the throughput in the mobile core network exceeds a predetermined throughput, or when the number of UEs registered in the mobile core network exceeds a predetermined number, the TDF 34 may determine that the mobile core network is congested.

Figure 3:
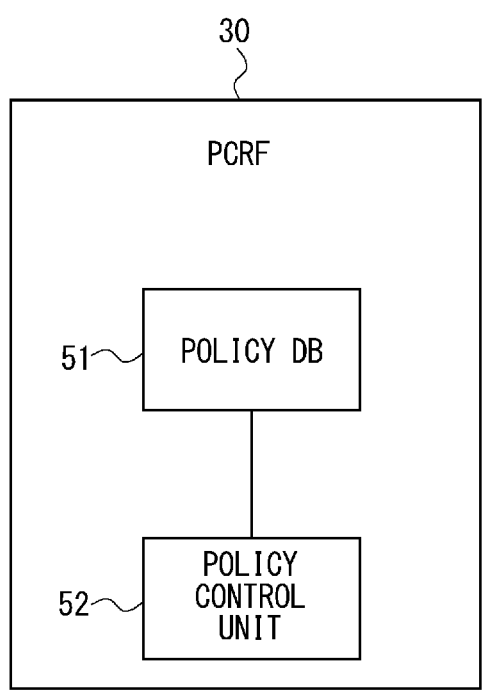
FIG. 3 is a configuration diagram of a PCRF according to the second embodiment.

Next, a configuration example of the PCRF 30 will be described with reference to FIG. 3. The PCRF 30 includes a policy DB (Database) 51 and a policy control unit 52. The policy DB 51 manages the group, the environmental information, and the policy applied to the group in association with one another. Information managed by the policy DB 51 will be described with reference to FIG. 4.

FIG. 4 shows the information managed by the policy DB 51. In FIG. 4, the time of day and the congestion state are managed as the environmental information. Further, the DL/UL APN AMBR is used as the policy applied to the group. The congestion state may be determined using information about the congestion status transmitted from at least one of the RCAF 38 and the TDF 34.

For example, in the case of AM 9:00-PM 9:00, and the congestion state of A1, U1 is applied to the UL APN AMBR of Group A, and D1 is applied to the DL APN AMBR of Group A. The A1 and A2 used in FIG. 4 indicate congestion levels. For example, a congestion level defined for A2 may be higher than that of A1. A high congestion level means that the network is more congested.

Moreover, the values of AMBR are defined for U1-U5 and D1-D5 used in FIG. 4. For example, the values of AMBR may become lower in the order of U1 to U5 and in the order of D1 to D5.

As for Group B, it is shown that U1 is applied to the UL APN AMBR, and D2 is applied to the DL APN AMBR when the congestion state is A1 regardless of the time of day. As for Group C, it is shown that U5 is applied to the UL APN AMBR, and D5 is applied to the DL APN AMBR regardless of the time of day and congestion state.

Returning to FIG. 3, the policy control unit 52 determines the DL/UL APN AMBR to be applied to the group according to the environmental information such as the time of day and the congestion state. Further, when the policy control unit 52 is notified that the environmental information has been changed, it changes the DL/UL APN AMBR to be applied to the group. Alternatively, when the policy control unit 52 is notified that the environmental information has been changed, it determines whether to change the DL/UL APN AMBR. The policy control unit 52 transmits the changed DL/UL APN AMBR to the PCEF 32.

Figure 5:
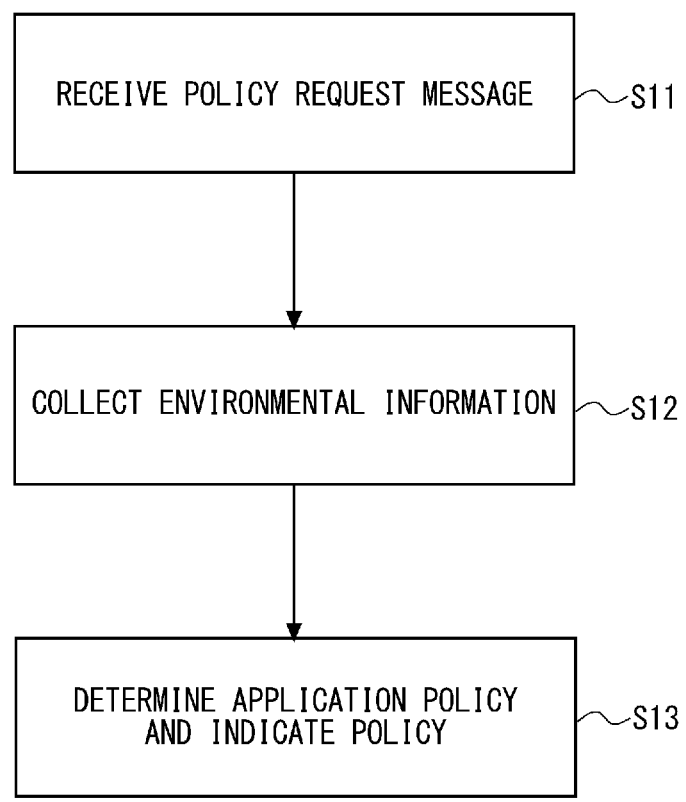
FIG. 5 is a diagram showing a flow of an application policy determination process in the PCRF according to the first embodiment.

Next, a flow of a process for determining an application policy in the PCRF 30 according to the second embodiment of the present invention will be described with reference to FIG. 5. First, the policy control unit 52 receives a policy request message transmitted from the PCEF 32 (S11). The policy request message includes identification information of the UE. Next, the policy control unit 52 collects the environmental information in order to determine the policy to be applied to the group to which the UE belongs, which is indicated by the identification information included in the policy request message (S12).

Next, the policy control unit 52 determines the application policy using the collected environmental information (S13). The policy control unit 52 indicates the determined policy to the PCEF 32.

Figure 6:
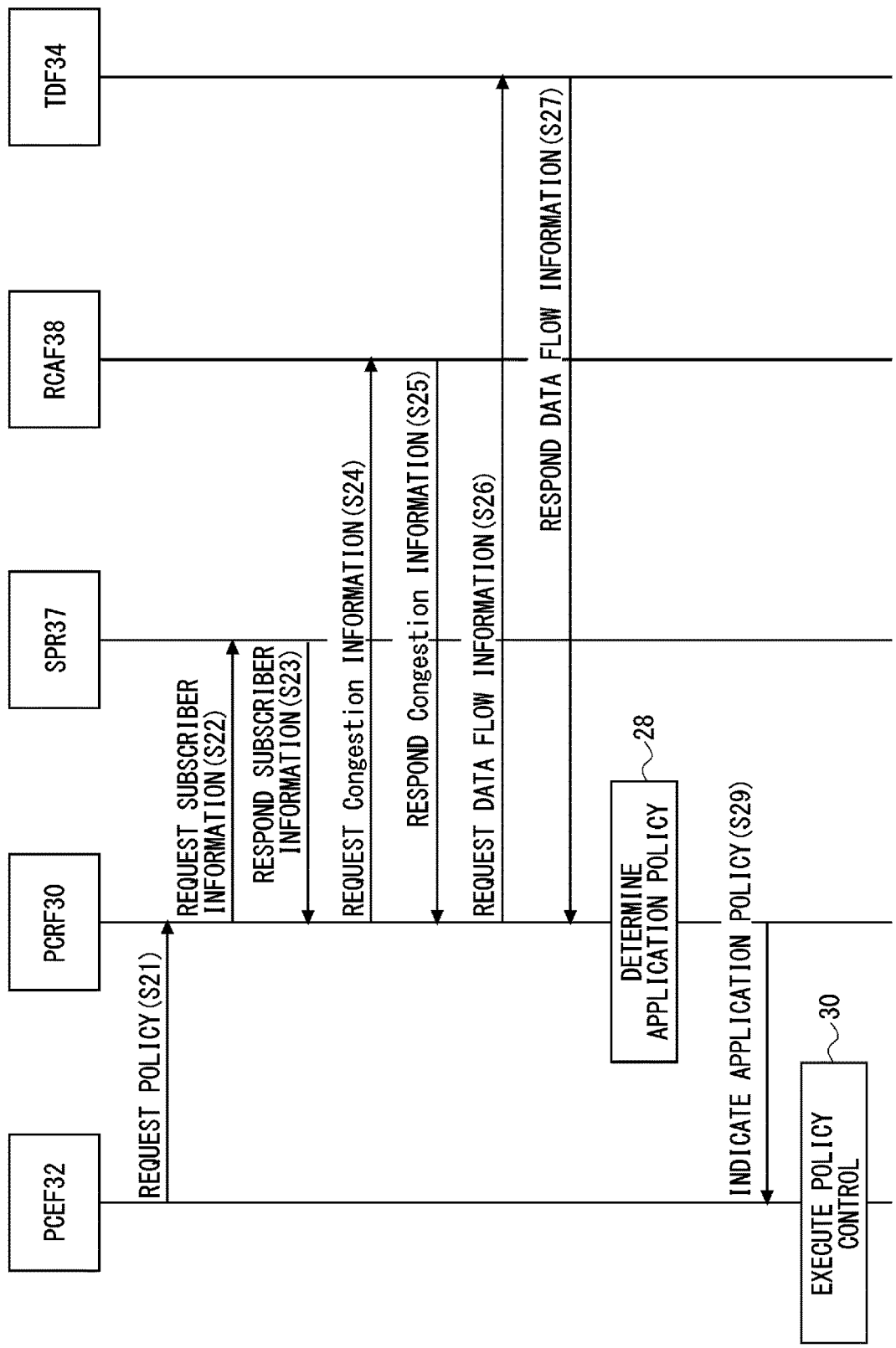
FIG. 6 is a diagram for describing a flow of a sequence related to policy determination according to the second embodiment.

Next, a sequence related to policy determination according to the second embodiment of the present invention will be described with reference to FIG. 6. First, the PCEF 32 transmits the policy request message to the PCRF 30 via the Gx interface (S21). The policy request message includes the identification information of the UE executing the communication and the APN used by the UE. The identification information of the UE may be, for example, IMSI (International Mobile Subscriber Identity). The policy request message is used to query the policy to be applied to the UE. Next, the PCRF 30 transmits a subscriber information request message to the SPR 37 via the Sp interface in order to acquire information about the group to which the UE indicated by the identification information included in the policy request message belongs (S22). The PCRF 30 includes the identification information of the UE in the subscriber information request message.

Next, the SPR 37 transmits, to the PCRF 30, a subscriber information response message in which the identification information of the group to which the UE belongs is set via the Sp interface (S23). The policy condition to be followed by the group based on the subscriber's communication contract may be registered in the policy DB 51 or updated using the subscriber information response message acquired at this time. Further, the policy DB 51 may be registered or updated periodically instead of when the PCRF 30 receives the subscriber information response message. The policy DB 51 may be registered or updated at a specified timing by a network administrator or the like.

Next, the PCRF 30 transmits a Congestion information request message to the RCAF 38 via the Np interface (S24) in order to acquire the congestion status in the RAN in which the UE is located. The PCRF 30 may acquire information about the location of the UE, for example, from the SPR 37 in the subscriber information response message in Step S23. The PCRF 30 also includes information about the location of the UE in the Congestion information request message.

Next, the RCAF 38 transmits a Congestion information response message including the information indicating the congestion status in the RAN in which the UE is located to the PCRF 30 via the Np interface (S25). Next, the PCRF 30 transmits a data flow information request message to the TDF 34 via the Sd interface in order to acquire information about the data flow of the APN used by the UE (S26). The information about the data flow is, for example, information indicating the congestion status of the APN designated by the UE.

The TDF 34 transmits a data flow information response message in which information about the data flow of the APN used by the UE is set to the PCRF 30 via the Sd interface (S27).

Next, the PCRF 30 determines the policy to be applied to the group using the information about the group acquired in Step S23, the information about the congestion status acquired in Step S25 and Step S27, and the policy DB 51 (S28). The PCRF 30 may identify the current time as time information using a timer in its own apparatus.

Next, the PCRF 30 transmits, to the PCEF 32, an application policy instruction message to the PCEF 32 via the Gx interface in order to indicate the policy to be applied to the group (S29). Next, the PCEF 32 applies the indicated policy to the communication related to the UE designated in Step S21 (S30).

As described above, the PCRF 30 according to the second embodiment of the present invention includes the policy DB 51 that manages policy information applied to the group. The policy control unit 52 can identify the policy to be applied to the group when the environmental information is changed using the environmental information changed at a specified timing and the policy DB 51.

The policy control unit 52 autonomously determines the policy to be applied to the group according to the change in the environmental information, thereby reducing the workload of the administrator or the like involved in the policy change.

Third Embodiment

Next, a sequence related to policy determination according to a third embodiment of the present invention will be described with reference to FIG. 7. First, when the congestion status of the RAN changes, the RCAF 38 transmits a Congestion information notification message including information for identifying the RAN and the congestion status of the RAN to the PCRF 30 (S41). For example, the PCRF 30 may notify the RCAF 38 in advance that the Congestion information notification message is transmitted to the PCRF 30 when the congestion status of the RAN in which the specific UE is located is changed.

Next, the PCRF 30 determines the policy to be applied to the group to which the specific UE belongs (S42) using the information about the congestion status included in the Congestion information notification message and the policy DB 51. The PCRF 30 acquires in advance the subscriber information about a plurality of UEs from the SPR 37. The PCRF 30 may identify the UE located in the RAN whose congestion status is indicated in the information notification message and the group to which the UE belongs using the subscriber information acquired in advance. Steps S43 and S44 are similar to Steps S29 and S30 in FIG. 6, respectively, and thus detailed descriptions thereof will be omitted.

As described above, the sequence related to the policy determination according to the third embodiment of the present invention enables the PCRF 30 to acquire the changed environmental status from the RCAF 38 or the like every time the environmental information is changed. In the second embodiment, the PCRF 30 executes the process of acquiring the environmental information for another node device in response to receiving the policy request message transmitted from the PCEF 32. On the other hand, in the third embodiment, the other node device detects the change in the environmental information, and the PCRF 30 can acquire the environmental information from the node device that has detected the change.

Figure 7:
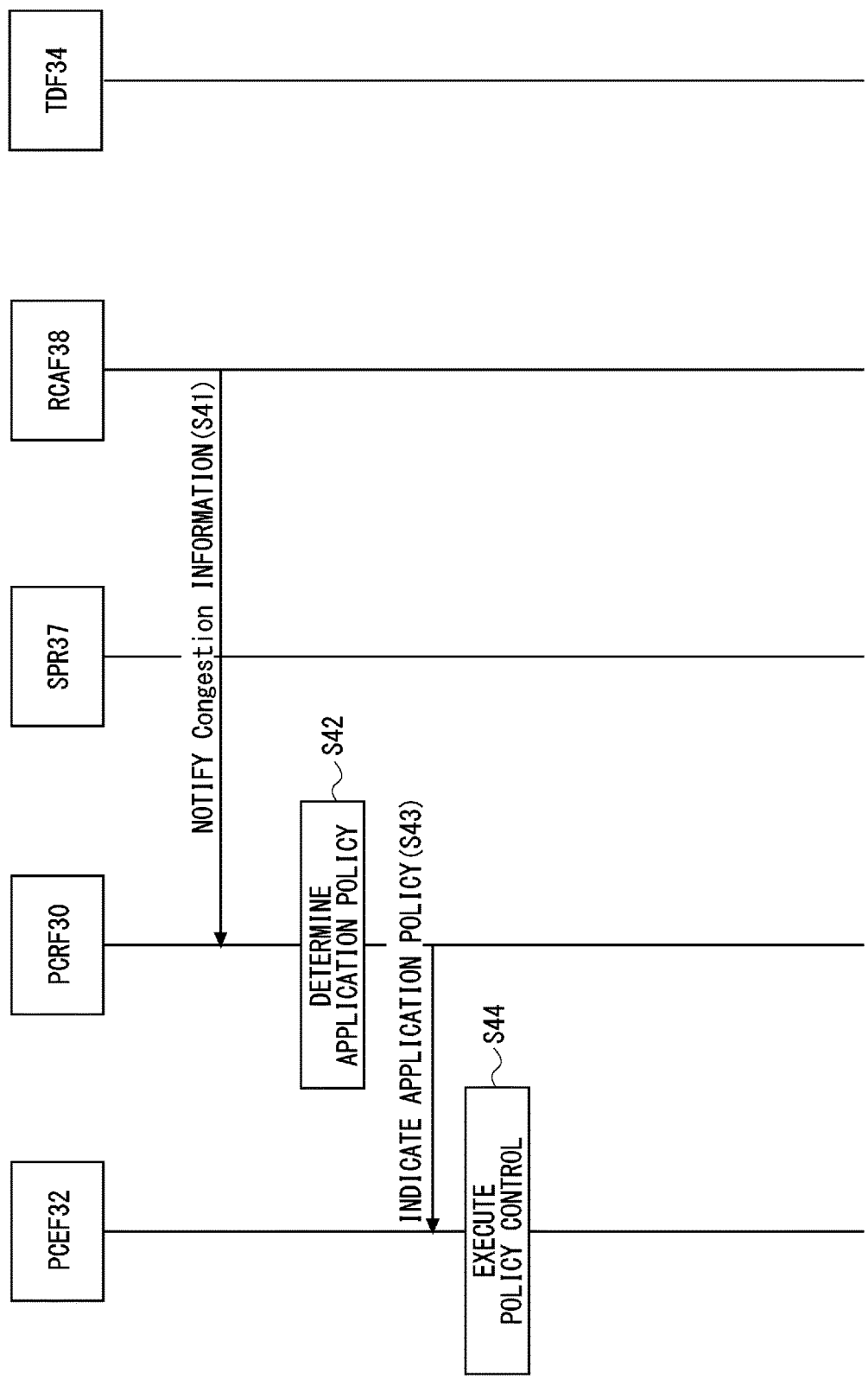
FIG. 7 is a diagram for describing a flow of a sequence related to policy determination according to a third embodiment.

FIG. 7 shows an example in which the RCAF 38 notifies the PCRF 30 of a change in the congestion status of the RAN. However, for example, the TDF 34 may transmit, to the PCRF 30, a data flow information notification message in which information about a data flow related to a specific APN is set.

Then, the PCRF 30 can determine the policy to be applied to the group to which the UE designating the specific APN belongs. Therefore, the PCRF 30 can change the policy to be applied to the group to which the UE designating the specific APN belongs at the timing when the congestion status of the specific APN is changed.

Fourth Embodiment

Figure 8:
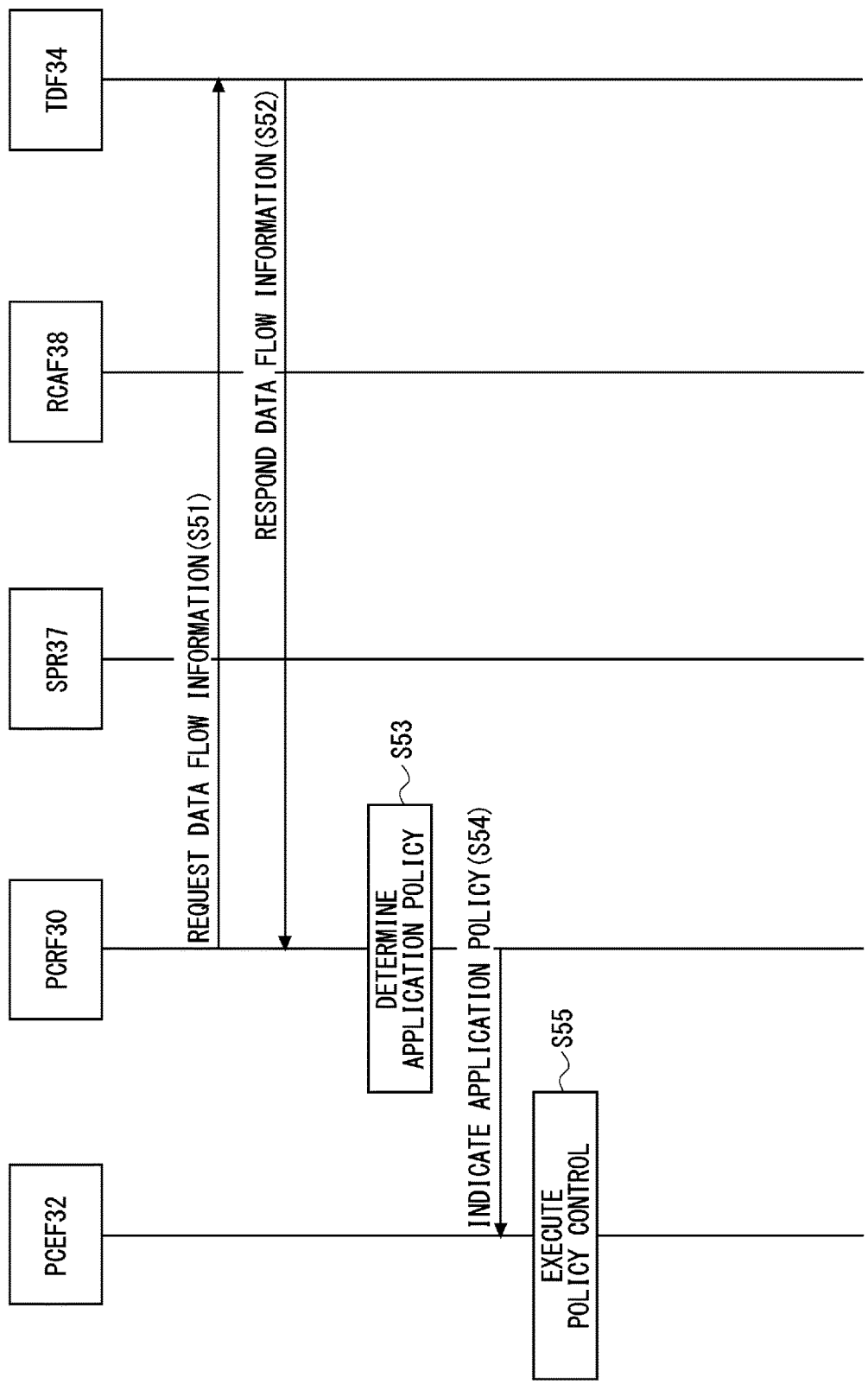
FIG. 8 is a diagram for describing a flow of a sequence related to policy determination according to a fourth embodiment.

Next, a sequence related to policy determination according to a fourth embodiment of the present invention will be described with reference to FIG. 8. In FIG. 8, the PCRF 30 transmits the data flow information request message related to a specific APN to the TDF 34 at a specific timing (S51). The specific timing may be a periodically determined timing. Further, the specific APN may be previously set by the administrator or the like of the PCRF 30. The TDF 34 transmits, to the PCRF 30, the data flow information response message including information about a traffic status at the time of acquiring the data flow information request message (S52).

The PCRF 30 may execute a process of transmitting the Congestion information request message to the RCAF 38 and acquiring information about the congestion status of the RAN at a specific timing, which is not shown in FIG. 8.

The PCRF 30 determines the policy to be applied to the group to which the UE using the specific APN belongs using the information about the traffic status acquired in Step S52 and the policy DB 51 (S53). The PCRF 30 acquires subscriber information on a plurality of UEs from the SPR 37 in advance. The PCRF 30 may identify the UE using the APN whose traffic status is indicated in the data flow information response message and the group to which the UE belongs using the subscriber information acquired in advance. Steps S54 and S55 are similar to Steps S29 and S30 in FIG. 6, respectively, and thus detailed descriptions thereof will be omitted.

As described above, the sequence related to the policy determination according to the fourth embodiment of the present invention enables the PCRF 30 to periodically acquire the environmental status from the TDF 34 or the like. Thus, the PCRF 30 can periodically change the policy to be applied to the group.

Figure 9:
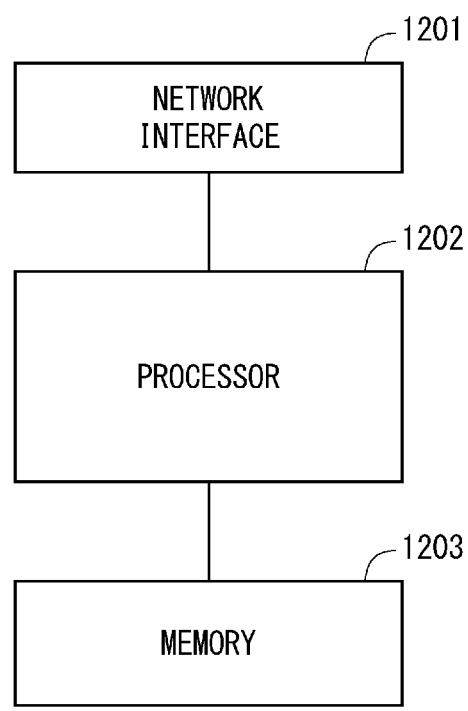
FIG. 9 is a configuration diagram of a PCRF entity 10, a PCEF entity 20, and a PCRF 30 according to the respective embodiments.

Next, configuration examples of the PCRF entity 10, the PCEF entity 20, and the PCRF 30 (hereinafter referred to as the PCRF entity 10 and the like) described in the above-described embodiments will be described below with reference to FIG. 9. FIG. 9 is a block diagram showing a configuration example of the PCRF entity 10 and the like. Referring to FIG. 9, the PCRF entity 10 and the like include a network interface 1201, a processor 1202, and a memory 1203. The network interface 1201 is used to communicate with other network node devices constituting the communication system. The network interface 1201 may include, for example, a network interface card (NIC) compliant with IEEE 802.3 series.

The processor 1202 reads out and executes software (computer program) from the memory 1203 to thereby perform processing of the PCRF entity 10 and the like described with reference to the sequence diagrams and flowcharts in the above embodiments. The processor 1202 may be, for example, a microprocessor, an MPU (Micro Processing Unit), or a CPU (Central Processing Unit). The processor 1202 may include a plurality of processors.

The memory 1203 is composed of a combination of a volatile memory and a non-volatile memory. The memory 1203 may include a storage physically separated from the processor 1202. In this case, the processor 1202 may access the memory 1203 via an I/O interface not shown.

In the example of FIG. 9, the memory 1203 is used to store software modules. By reading and executing these software modules from the memory 1203, the processor 1202 can perform the processing of the PCRF entity 10 and the like described in the above embodiments.

As described with reference to FIG. 9, each of the processors of the PCRF entity 10 and the like executes one or more programs including instructions for causing a computer to execute the algorithm described with reference to the drawings.

In the above example, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), Compact Disc Read Only Memory (CD-ROM), CD-R, CD-R/W, semiconductor memories (such as Mask ROM, Programmable ROM (PROM), Erasable PROM (EPROM), flash ROM, Random Access Memory (RAM)). This program can be stored and provided to a computer using any type of non-transitory computer readable media. Non-transitory computer readable media include any type of tangible storage media. Note that the present invention is not limited to the above-described embodiments, and modifications can be made as appropriate without departing from the scope of the invention.

Note that the present invention is not limited to the above-described embodiments, and modifications can be made as appropriate without departing from the scope of the invention.

Although the present invention has been described with reference to the embodiments, the present invention is not limited by the above. Various changes that can be understood by those skilled in the art within the scope of the invention can be made to the configuration and details of the present invention.

The present application is based upon and claims the benefit of priority from Japanese Patent Application No. 2016-047982, filed on Mar. 11, 2016, the entire contents of which are hereby incorporated by reference.

The whole or part of the exemplary embodiments disclosed above can be described as, but not limited to, the following supplementary notes.

(Supplementary Note 1)

A policy control system comprising:

policy control means for determining a policy to be applied to a group including a plurality of wireless terminals according to environmental information changed at a specified timing; and policy control execution means for applying the policy determined by the policy control means to communication related to the plurality of wireless terminals included in the group.

(Supplementary Note 2)

The policy control system according to Supplementary note 1, wherein the policy control means comprises a policy database configured to manage information about the group, and the environmental information, information about the policy to be applied to the group in association with one another.

(Supplementary Note 3)

The policy control system according to Supplementary note 2, wherein when the policy control means receives a policy notification request message including identification information of the wireless terminal transmitted from the policy control execution means, the policy control means identifies the group to which the wireless terminal belongs and the environmental information 11, searches the policy database using the identified group and the environmental information, and determines the policy to be applied to the group to which the wireless terminal belongs.

(Supplementary Note 4)

The policy control system according to Supplementary note 2, wherein the policy control means collects the environmental information from an external apparatus at a predetermined timing and determines the policy to be applied to at least one group among a plurality of the groups managed by the policy database.

(Supplementary Note 5)

The policy control system according to any one of Supplementary notes 1 to 4, wherein the policy control execution means controls the communication related to the plurality of wireless terminals according to an upper limit transmission capacity of uplink data and downlink data related to the plurality of wireless terminals included in the group.

(Supplementary Note 6)

The policy control system according to any one of Supplementary notes 1 to 5, wherein the environmental information comprises traffic information indicating a congestion status of traffic.

(Supplementary Note 7)

The policy control system according to Supplementary note 6, wherein the traffic information comprises at least one of a traffic status of a radio area network or a traffic status of a mobile core network.

(Supplementary Note 8)

The policy control system according to any one of Supplementary notes 1 to 7, wherein the policy control means is included in a PCRF entity, and the policy control execution means is included in a PCEF entity.

(Supplementary Note 9)

A PCRF entity comprising a policy control unit configured to determine a policy to be applied to a group including a plurality of wireless terminals according to environmental information changed at a specified timing and transmit information about the determined policy to a PCEF entity that applies the policy to communication related to the plurality of wireless terminals included in the group.

(Supplementary Note 10)

The PCRF entity according to Supplementary note 9, further comprising a policy database configured to manage information about the group, the environmental information, and information about the policy to be applied to the group in association with one another.

(Supplementary Note 11)

The PCRF entity according to Supplementary note 10, wherein when the policy control unit receives a policy notification request message including identification information of the wireless terminal transmitted from the PCEF entity, the policy control means identifies the group to which the wireless terminal belongs and the environmental information, searches the policy database using the identified group and the environmental information, and determines the policy to be applied to the group to which the wireless terminal belongs.

(Supplementary Note 12)

The PCRF entity according to Supplementary note 10, wherein the policy control unit collects the environmental information from an external apparatus at a predetermined timing and determines the policy to be applied to at least one group among a plurality of the groups managed by the policy database.

(Supplementary Note 13)

A policy control method comprising:

determining a policy to be applied to a group including a plurality of wireless terminals according to environmental information changed at a specified timing; and transmitting information about the determined policy to a PCEF entity that applies the policy to communication related to the plurality of wireless terminals included in the group.

(Supplementary Note 14)

A program that causes a computer to execute:

determine a policy to be applied to a group including a plurality of wireless terminals according to environmental information changed at a specified timing; and transmit information about the determined policy to a PCEF entity that applies the policy to communication related to the plurality of wireless terminals included in the group.

REFERENCE SIGNS LIST

10 PCRF ENTITY
11 POLICY CONTROL UNIT
20 PCEF ENTITY
21 POLICY CONTROL EXECUTION UNIT
30 PCRF
31 GATEWAY
32 PCEF
33 BBERF
34 TDF
35 TSSF
36 OFCS
37 SPR
38 RCAF
39 AF
40 SCEF
41 OCS
51 POLICY DB
52 POLICY CONTROL UNIT

The invention claimed is:

1. A policy control system including a first hardware, including a processor and a memory, and a second hardware, including a processor and a memory, the policy control system comprising:

a policy control unit implemented at least by the first hardware and configured to determine a policy to be applied to a group including a plurality of wireless terminals according to environmental information changed at a specified timing; and a policy control execution unit implemented at least by the second hardware and configured to apply the policy determined by the policy control unit to communication related to the plurality of wireless terminals included in the group, wherein the policy control unit comprises a policy database configured to manage information about the group, the environmental information, and information about the policy to be applied to the group in association with one another and when the policy control unit receives a policy notification request message including identification information of a wireless terminal transmitted from the policy control execution unit, the policy control unit identifies the group to which the wireless terminal belongs and the environmental information, searches the policy database using the identified group and the environmental information, and determines the policy to be applied to the group to which the wireless terminal belongs.

2. The policy control system according to claim 1, wherein the policy control unit collects the environmental information from an external apparatus at a predetermined timing and determines the policy to be applied to at least one group among a plurality of the groups managed by the policy database.

3. The policy control system according to claim 1, wherein the policy control execution unit controls the communication related to the plurality of wireless terminals according to an upper limit transmission capacity of uplink data and downlink data related to the plurality of wireless terminals included in the group.

4. The policy control system according to claim 1, wherein the environmental information comprises traffic information indicating a congestion status of traffic.

5. The policy control system according to claim 4, wherein the traffic information comprises at least one of a traffic status of a radio area network or a traffic status of a mobile core network.

6. The policy control system according to claim 1, wherein the policy control unit is included in a PCRF entity, and the policy control execution unit is included in a PCEF entity.

7. A PCRF entity including a hardware, including a processor and a memory, the PCRF entity comprising:
a policy control unit implemented at least by the hardware and configured to determine a policy to be applied to a group including a plurality of wireless terminals according to environmental information changed at a specified timing and transmit information about the determined policy to a PCEF entity that applies the policy to communication related to the plurality of wireless terminals included in the group, and
a policy database configured to manage information about the group, the environmental information, and information about the policy to be applied to the group in association with one another, wherein
when the policy control unit receives a policy notification request message including identification information of a wireless terminal transmitted from the PCEF entity, the policy control unit identifies the group to which the wireless terminal belongs and the environmental information, searches the policy database using the identified group and the environmental information, and determines the policy to be applied to the group to which the wireless terminal belongs.

8. The PCRF entity according to claim 7, wherein the policy control unit collects the environmental information from an external apparatus at a predetermined timing and determines the policy to be applied to at least one group among a plurality of the groups managed by the policy database.

9. A policy control method comprising:
managing, with a policy database, information about a group, environmental information, and information about a policy to be applied to a group including a plurality of wireless terminals in association with one another;
determining the policy to be applied to the group according to environmental information changed at a specified timing;
transmitting information about the determined policy to a PCEF entity that applies the policy to communication related to the plurality of wireless terminals included in the group;
receiving a policy notification request message including identification information of a wireless terminal transmitted;
identifying the group to which the wireless terminal belongs and the environmental information;
searching the policy database using the identified group and the environmental information; and
determining the policy to be applied to the group to which the wireless terminal belongs.

* * * * *